United States Patent
Ito (10) Patent No.: US 11,704,818 B2
(45) Date of Patent: Jul. 18, 2023

(54) MOTION VECTOR CALCULATION DEVICE, IMAGING DEVICE, AND MOTION VECTOR CALCULATION METHOD

(71) Applicant: CANON KABUSHIKI KAISHA, Tokyo (JP)

(72) Inventor: Taku Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/578,138

(22) Filed: Jan. 18, 2022

(65) Prior Publication Data

US 2022/0230329 A1    Jul. 21, 2022

(30) Foreign Application Priority Data

Jan. 20, 2021 (JP) ................. 2021-006856

(51) Int. Cl.
| | |
|---|---|
| H04N 5/232 | (2006.01) |
| G06T 7/246 | (2017.01) |
| H04N 23/67 | (2023.01) |
| H04N 23/68 | (2023.01) |
| H04N 23/959 | (2023.01) |

(52) U.S. Cl.
CPC .......... *G06T 7/246* (2017.01); *H04N 23/673* (2023.01); *H04N 23/682* (2023.01); *H04N 23/6811* (2023.01); *H04N 23/959* (2023.01)

(58) Field of Classification Search
CPC . G06T 7/246; G06T 7/20; G06T 2207/20201; H04N 5/232123; H04N 5/232125; H04N 5/23254; H04N 5/23264; H04N 5/2328
See application file for complete search history.

(56) References Cited

U.S. PATENT DOCUMENTS

| | | | |
|---|---|---|---|
| 2017/0032536 A1* | 2/2017 | Lee | .......... H04N 7/183 |
| 2020/0050013 A1* | 2/2020 | Rhee | .......... G03B 5/02 |
| 2020/0111220 A1 | 4/2020 | Delbruck et al. | |

FOREIGN PATENT DOCUMENTS

JP        2020-522067 A        7/2020

* cited by examiner

*Primary Examiner* — Yogesh K Aggarwal
(74) *Attorney, Agent, or Firm* — Cowan, Lebowitz & Latman, P.C.

(57) ABSTRACT

An optical device acquires event data based on an output of an event sensor detecting a change in luminance of a subject image and maps the event data acquired in a mapping time to generate a frame. The optical device performs control such that the mapping on the event data is overlapped partially in a plurality of the frames and calculates a motion vector based on the plurality of frames in which there is a difference of the mapping time at a start time of the mapping.

14 Claims, 6 Drawing Sheets

SUBJECT THAT HAS STRAIGHT SHAPE

FIG. 3C

SUBJECT WITH LOW CONTRAST

MOTION VECTOR CALCULATION DEVICE, IMAGING DEVICE, AND MOTION VECTOR CALCULATION METHOD

BACKGROUND OF THE INVENTION

Field of the Invention

The present invention relates to a motion vector calculation device, an imaging device, and a motion vector calculation method.

Description of the Related Art

Event-based vision sensors (hereinafter referred to as "event sensors") that have pixels detecting changes in luminance of incident subject light and outputting event signals have been suggested. Optical devices such as imaging devices can acquire event data which is data related to the event signals. The event sensors have features of high-speed operation, a high dynamic range, and low-power consumption compared to known complementary metal oxide semiconductor (CMOS) sensors. Published Japanese Translation No. 2020-522067 of the PCT International Publication discloses a method of calculating motion vectors by generating frames by mapping event data generated for a predetermined time and comparing the generated frames.

In the technology disclosed in Published Japanese Translation No. 2020-522067 of the PCT International Publication, however, a period in which motion vectors are calculated may be rate-determined in accordance with a predetermined time in which event data is mapped (hereinafter referred to as a "mapping time"). The mapping time is any set value, but values with which motion vectors can be calculated with precision change in accordance with magnitude of the motion vectors or a subject shape. Therefore, it is not desirable to change the mapping time in accordance with a desired calculation period.

SUMMARY OF THE INVENTION

According to the present invention, a calculation period of motion vectors is improved.

According to an embodiment of the present invention, a vector calculation device includes: an acquisition unit configured to acquire data including pixel information of a pixel in which a change in luminance occurs; a generation unit configured to perform a predetermined process on the data acquired in a first time period from a start time to generate a frame; a control unit configured to perform control such that the first time periods are overlapped partially for a plurality of the frames; and a calculation unit configured to calculate a motion vector based on a frame group including the plurality of frames for which the start times of the predetermined process are within the first time period from the start time for the first frame in the group.

Further features of the present invention will become apparent from the following description of exemplary embodiments with reference to the attached drawings.

DESCRIPTION OF THE EMBODIMENTS

First Embodiment

Figure 1:
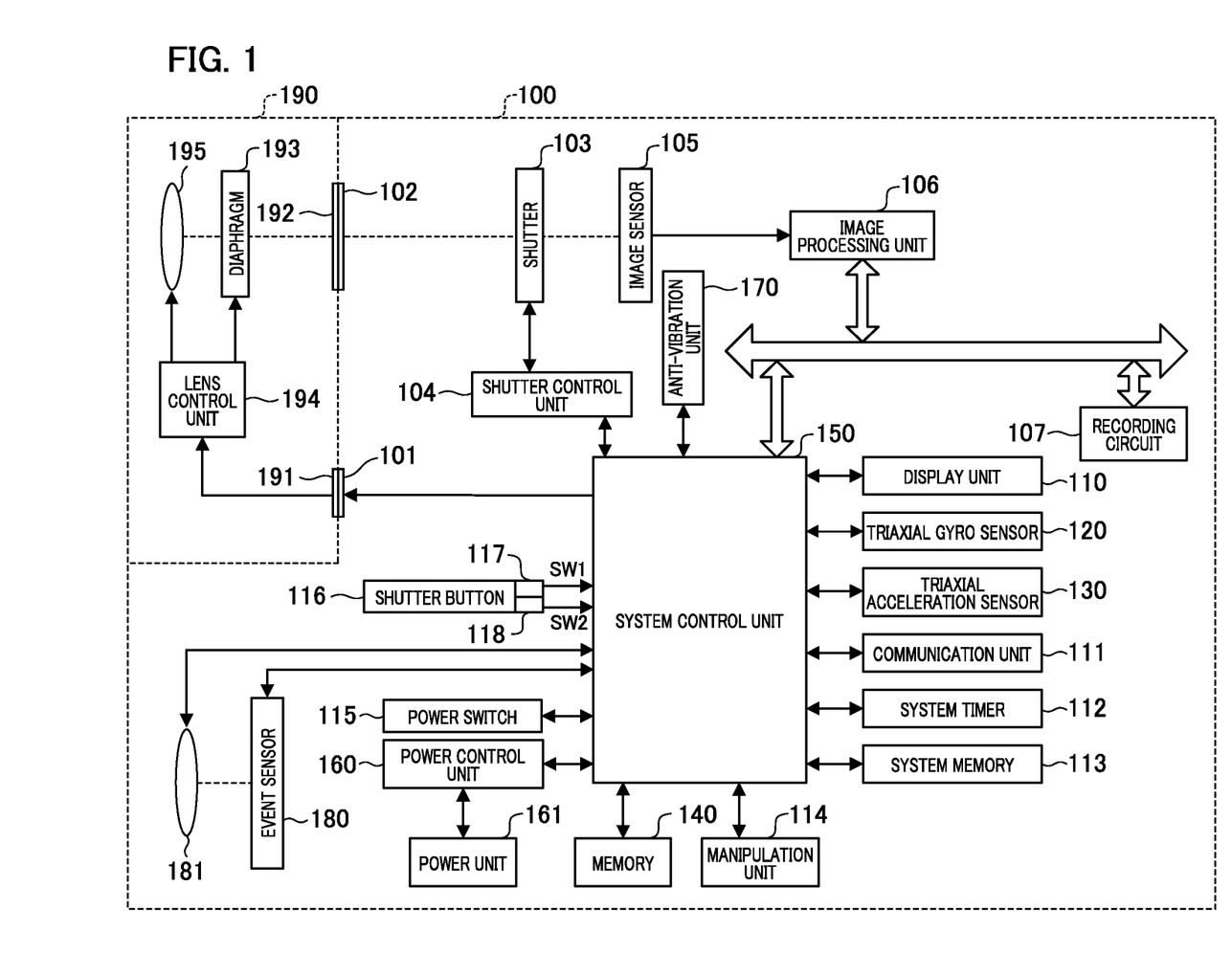
FIG. 1 is a diagram illustrating an exemplary configuration of an optical device.

FIG. 1 is a diagram illustrating an exemplary configuration of an optical device according to an embodiment. In FIG. 1, a lens change type camera (an imaging device) will be exemplified as an example of the optical device in description. Of course, the present invention can also be applied to a lens integrated camera. The present invention can also be applied to a motion vector calculation device that calculates motion vectors based on information acquired from the outside.

The imaging device illustrated in FIG. 1 includes a body unit 100 of the imaging device and a lens unit 190 that guides incident light to an image sensor 105 inside the body unit 100. The lens unit 190 can be detachably mounted on the body unit 100.

First, a configuration of the body unit 100 will be described. A shutter 103 adjusts an amount of light. A shutter control unit 104 controls the shutter 103 while cooperating with a lens control unit 194 inside the lens unit 190 based on exposure information from an image processing unit 106. The image sensor 105 is an imager that photoelectrically converts the subject light. Specifically, an optical image of a subject (not illustrated) is formed on the image sensor 105 via the lens 195, a diaphragm 193, a lens-side mounting unit 192, a body-side mounting unit 102 and the shutter 103, and then the optical image is converted into an electric signal.

The image processing unit 106 performs a predetermined calculation process on a video signal output from the image sensor 105 and performs image processing such as a pixel interpolation process, a color conversion process, and a white balancing process based on a calculation result. The display unit 110 displays an image processed result by the image processing unit 106. The image processing unit 106 has an image compression function such as JPEG.

A recording circuit 107 is a circuit that performs reading and writing on a detachably mounted recording medium such as a semiconductor memory on which image data is recorded or read. A communication unit 111 is connected to a wired or wireless cable to transmit and receive a video signal or a sound signal. The communication unit 111 can also be connected to a wireless local area network (LAN) or the Internet. The communication unit 111 can transmit a through-image obtained by imaging or an image recorded on the recording circuit 107. The communication unit 111 can receive image data or various kinds of other information from external devices.

A manipulation unit 114 receives a manipulation from a user and inputs various operation instructions in accordance with user manipulations to the system control unit 150. The manipulation unit 114 includes any one of a switch or a dial, a touch panel, pointing by visual line detection, and a voice recognition device or a combination thereof.

The system timer 112 measures a time which is used for various kinds of control or a time of an embedded clock. In the system memory 113, a constant and a variable for an operation of the system control unit 150, a program read from the memory 140, and the like are loaded. In the system memory 113, for example, a random access memory (RAM) is used. The system memory 113 accumulates each axis output value of a triaxial acceleration sensor 130. The power of a power switch 115 can set by being switched between ON and OFF of an imaging device.

The shutter button 116 is a manipulator that performs an imaging instruction. A first shutter switch 117 is turned on in accordance with an imaging preparation instruction by half pushing the shutter button 116 to generate a first shutter switch signal (SW1). In accordance with the SW1, an operation such as an autofocus process, an autoexposure process, an auto-white balancing process, or a flash pre-light-emitting process is started. A second shutter switch 118 is turned on in accordance with an imaging instruction by fully pushing the shutter button 116 to generate a second shutter switch signal (SW2). In accordance with the SW2, the system control unit 150 starts an operation of a series of imaging processes from reading of a signal from the image sensor 105 to writing of image data on the recording circuit 107.

A triaxial gyro sensor 120 detects an angular velocity of the imaging devices on three axes. The triaxial acceleration sensor 130 detects an acceleration of the imaging device on three axes. The memory 140 stores a constant, a program, or the like for an operation of the system control unit 150. The memory 140 includes a nonvolatile memory capable of erasing and storing data electrically, and a read-only memory (ROM) can be used.

The system control unit 150 includes at least one processor and controls an operation of the whole imaging device. The system control unit 150 controls the lens control unit 194 included in the lens unit 190 via connectors 101 and 191. A power control unit 160 includes a battery detection circuit, a protective circuit, a DC/DC converter, and a low drop out (LDO) regulator. The power control unit 160 controls a power unit 161 based on an instruction from the system control unit 150 and supplies a desired power voltage to each unit of the imaging device for a desired period. The power control unit 160 performs detection of whether a battery is mounted, a kind of battery, and a residual quantity and protects a load circuit connected to the power circuit by disconnecting power when an overcurrent is detected. The power unit 161 includes a primary battery such as an alkaline battery or a lithium battery or a secondary battery such as a NiCd battery, a NiMH battery, or a Li battery and an AC adaptor.

The body-side mounting unit 102 is an interface that connects the body unit 100 to the lens unit 190. The connector 101 is a connector that electrically connects the body unit 100 to the lens unit 190. An anti-vibration unit 170 is a corrector that corrects (reduces vibration) of shake (camera shake) occurring in a captured image. The anti-vibration unit 170 changes a position of the image sensor 105 under the control of the system control unit 150. Thus, the camera shake is corrected. In this example, the system control unit 150 functions as a correction controller, calculates motion vectors at a high speed based on event data, and drives the anti-vibration unit 170 using the calculated motion vectors as a motion amount of the imaging device. For example, a lens that corrects camera shake may be provided on the side of the lens unit 190 and the imaging device may correct the camera shake by driving this lens.

The event sensor 180 is an event-based vision sensor that has pixels detecting a change in luminance of a subject image formed through an optical system 181 of the event sensor 180 and generating and outputting a signal (an event signal). The event sensor 180 outputs the event signal to the system control unit 150 through serial communication. Thus, the system control unit 150 acquires data related to the event signal (event data). The event data is data including pixel information in which a change in luminance occurs. The event data includes, for example, a time stamp of the change in luminance, coordinate information of a pixel at which the change in luminance is detected, and information regarding a kind of change in the luminance.

Since the event sensor 180 outputs the pixel information in which a change in luminance occurs, redundancy of information to be output is reduced compared to a CMOS sensor of the related art. Accordingly, the event sensor 180 has features of high-speed operation, a high dynamic range, and low power. Since a CMOS sensor of the related art outputs information periodically, a generation period of frames necessary to calculate motion vectors depends on a frame rate. On the other hand, an event sensor outputs information including a timing at which a change in luminance occurs in units of pixels at a high speed. Accordingly, the system control unit 150 can generate frames at a high speed by mapping event data generated for a predetermined time. The mapping is an example of a predetermined process on the event data and is a process of combining information included in the event data at a predetermined time (a mapping time). The optical system 181 of the event sensor 180 includes an actuator that changes a focal distance. The focal distance is controlled by the system control unit 150.

Next, a configuration of the lens unit 190 will be described. The lens unit 190 is an interchangeable lens-type lens unit and guides subject light to the image sensor 105 from the lens 195 via the diaphragm 193, the lens-side mounting unit 192, the body-side mounting unit 102, and the shutter 103 to form an image. The connector 191 is a connector that electrically connects the lens unit 190 to the body unit 100. The lens-side mounting unit 192 is an interface that connects the lens unit 190 to the body unit 100. The diaphragm 193 adjusts an amount of light entering the lens 195.

The lens control unit 194 controls the whole lens unit 190. The lens control unit 194 has functions of a memory that stores a constant, a variable, a program, or the like for an operation and a nonvolatile memory that retains identification information such as a unique number of the lens unit 190, management information, functional information such as an open diaphragm value, a minimum diaphragm value, and a focal distance, each present or past setting value, and the like. The lens control unit 194 can control focusing of the lens 195 in accordance with a focus state of an image measured by the image processing unit 106, change a formation position of a subject image incident on the image sensor 105, and perform an AF operation. The lens control unit 194 also has a function of controlling the diaphragm 193 or controlling a focal distance of the lens 195.

Figure 2:
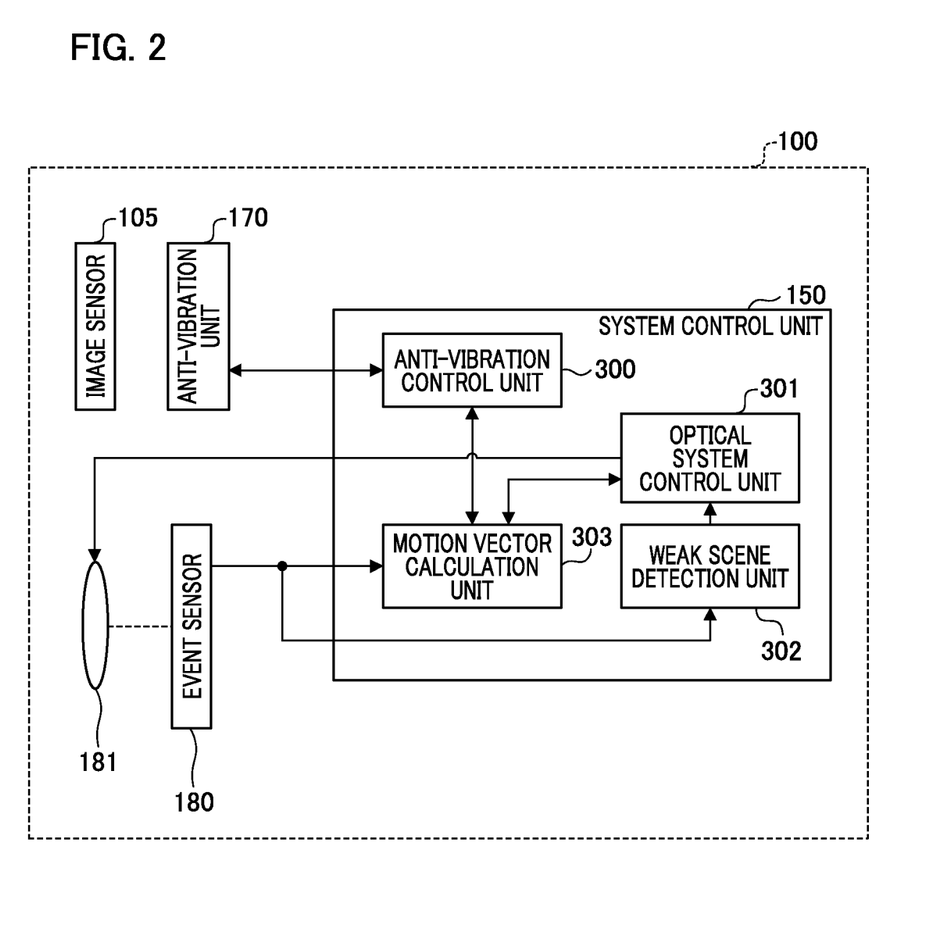
FIG. 2 is a diagram illustrating an exemplary configuration of an anti-vibration mechanism included in the optical device.

FIG. 2 is a diagram illustrating an exemplary configuration of an anti-vibration mechanism included in the optical device according to the embodiment. The system control unit 150 corrects a camera shake by calculating motion vectors based on an output of the event sensor 180 and driving the anti-vibration unit 170 based on the calculated motion vectors. As illustrated in FIG. 2, the system control unit 150 includes an anti-vibration control unit 300, an optical system control unit 301, a weak scene detection unit 302, and a motion vector calculation unit 303.

The motion vector calculation unit 303 calculates motion vectors based on event data acquired from the event sensor 180. The anti-vibration control unit 300 determines a motion amount of the imaging device 100 from values of the motion vectors calculated by the motion vector calculation unit 303 and drives the anti-vibration unit 170 so that a captured image is not shaken based on the determined motion amount.

The optical system control unit 301 controls the optical system 181. The optical system control unit 301 determines a setting range of a focal distance of the optical system 181 in accordance with an output of the weak scene detection unit 302 or an output of the motion vector calculation unit 303 and controls a focal distance of the optical system 181 within the setting range. The weak scene detection unit 302 performs a weak scene detecting process based on an output of the event sensor 180. When pixel information of a subject included in the output of the event sensor 180 satisfies a predetermined subject condition in which motion vectors cannot be calculated accurately, the weak scene detection unit 302 notifies the optical system control unit 301 of information indicating detection of a weak scene as a detection result. The pixel information of the subject is pixel information of a region corresponding to the subject among the pixel information in which a change in luminance occurs and which is output by the event sensor 180.

Figure 3A:
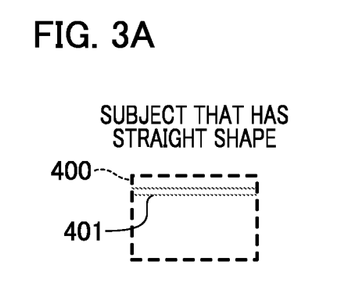
FIGS. 3A to 3D are diagrams illustrating examples of control of focal distances in accordance with weak scenes.
Figure 3B:
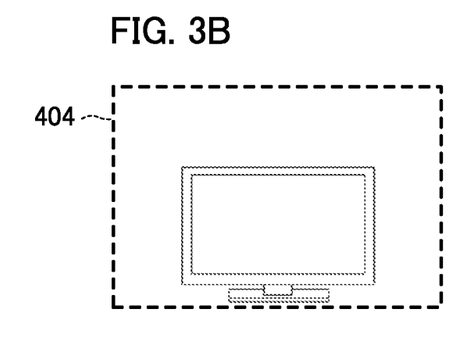
Figure 3C:
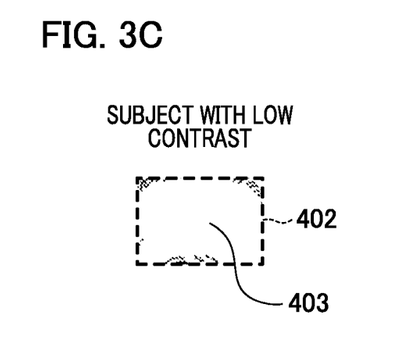

FIGS. 3A to 3D are diagrams illustrating examples of control of focal distances in accordance with weak scenes. FIGS. 3A and 3C illustrate examples of weak scenes. In FIG. 3A, a subject has a straight shape. Within an angle of field 400, a subject 401 that has a straight shape is shown. In FIG. 3C, contrast of a subject is low and is equal to or less than a threshold. A predetermined region (in this example, a middle region 403) of the angle of field 402 has low contrast. In the weak scenes illustrated in FIGS. 3A and 3C, a movement direction is not determined uniquely when two sets of frames for calculating motion vectors are compared. Therefore, calculation accuracy deteriorates.

Figure 3D:
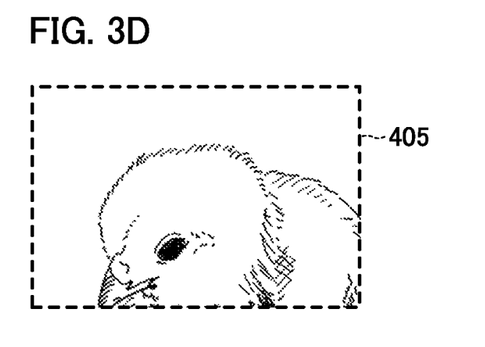

When the weak scene illustrated in FIG. 3A is detected, the optical system control unit 301 lowers a focal distance and widens an angle of field. Thus, as illustrated in FIG. 3B, a subject near a subject 400 illustrated in FIG. 3A is included in a widened angle of field 404, and thus calculation accuracy of the motion vectors is improved. When the weak scene illustrated in FIG. 3C is detected, the optical system control unit 301 lowers a focal distance and widens an angle of field. Thus, as illustrated in FIG. 3D, a subject near a middle region 403 with low contrast illustrated in FIG. 3C is included in a widened angle of field 405, and thus calculation accuracy of the motion vectors is improved.

Figure 4:
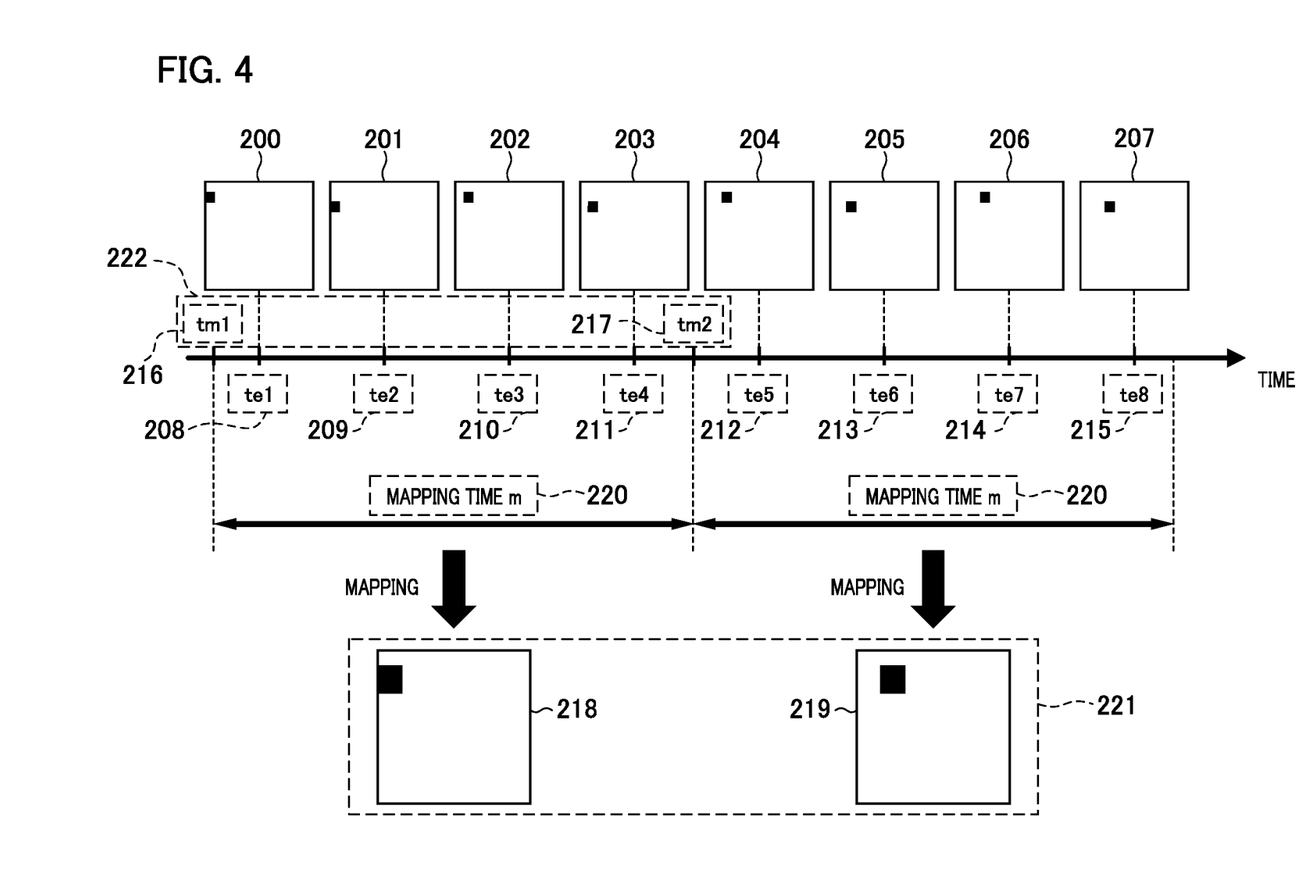
FIG. 4 is a diagram illustrating a motion vector calculation method of the related art.

FIG. 4 is a diagram illustrating a motion vector calculation method of the related art. Event data 200 to event data 207 include coordinate information of each pixel at which a change in luminance occurs. A pixel indicated by a black rectangle is a pixel at which a change in luminance occurs. Times 208 to 215 are times at which the change in luminance occurs.

Reference numeral 222 denotes a time at which mapping starts (a mapping start time). In this example, a mapping start time (tm1) 216 and a mapping start time (tm2) 217 are illustrated. The mapping start time tm2 is expressed as a sum of the immediately previous mapping start time tm1 and a mapping time m denoted by reference numeral 220.

Reference numeral 221 denotes a frame group generated from the event data. The frame group 221 includes frames 218 and 219. The frame 218 is generated by mapping coordinates of pixels included in the event data 200 to the event data 203 generated from the mapping start time tm1 to the mapping time m. The frame 219 is generated by mapping coordinates of pixels included in event data 204 to event data 207 generated from the mapping start time tm2 to the mapping time m. Then, motion vectors are calculated by template matching using the adjacent frames 218 and 219.

In the motion vector calculation method of the related art described with reference to FIG. 4, a period at which the frame group 221 is generated depends on the mapping time m. Accordingly, a motion vector calculation period is determined in accordance with the mapping time m, and thus it is difficult to improve the motion vector calculation period. An optical device according to a first embodiment to be described below can improve the motion vector calculation period.

Figure 5:
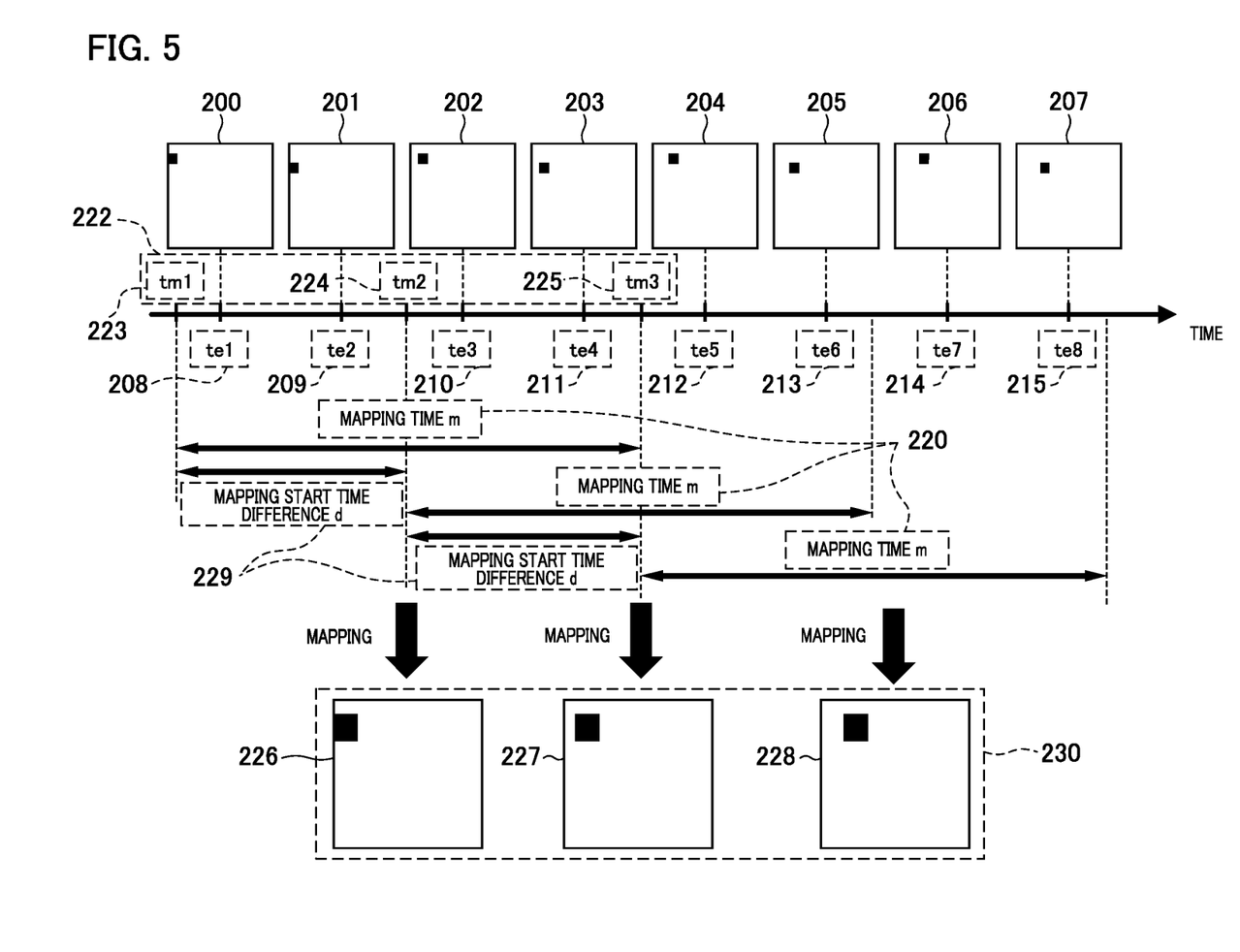
FIG. 5 is a diagram illustrating a motion vector calculation method by an optical device according to a first embodiment.

FIG. 5 is a diagram illustrating a motion vector calculation method by the optical device of the first embodiment. Of elements denoted by reference numerals illustrated in FIG. 5, elements with the same reference numerals as the reference numerals illustrated in FIG. 4 are the same as the elements denoted by the reference numerals illustrated in FIG. 4. Reference numerals 223, 224, and 225 denote mapping start times. Reference numeral 229 denotes a mapping start time difference d. The mapping start time difference d indicates a difference (a time difference) between a mapping start time corresponding to each frame and a mapping start time corresponding to an immediately previous frame. The mapping start time difference d (a second time) is set to a time shorter than the mapping time m (a first time).

In the first embodiment, the system control unit 150 partially overlaps mapping of the event data for generating frames in a plurality of frames. Specifically, the system control unit 150 starts the mapping of the event data and continuously generates a plurality of frames 226, 227, and 228 whenever a time corresponding to the mapping start time difference d passes. That is, the system control unit 150 starts the mapping of the event data corresponding to each frame by delaying the mapping start time difference d from the mapping start time of the event data corresponding to an immediately previous frame. Then, a frame group 230 in FIG. 5 is generated.

The system control unit 150 generates the frame 226 by mapping the event data 200 to the event data 203 generated from the mapping start time tm1 to the mapping time m. The system control unit 150 generates the frame 227 by mapping the event data 202 to the event data 205 generated from the mapping start time tm2 to the mapping time m. The mapping start time tm2 is a time which passes by the mapping start time difference d from the mapping start time tm1. The system control unit 150 generates the frame 228 by mapping the event data 204 to the event data 207 generated from a mapping start time tm3 to the mapping time m. The mapping start time tm3 is a time which passes by the mapping start time difference d from the mapping start time tm2.

The mapping start time difference d is determined in accordance with a degree n of overlapping of the event data. For example, the mapping start time difference d is set to a time obtained by dividing the mapping time m by the degree n of overlapping of the mapping of the event data as in the following expression.

Mapping start time difference $d$=mapping time $m/n$

In the example illustrated in FIG. 5, the mapping of the event data 202 and the event data 203 is overlapped between two frames (the frames 226 and 227). The mapping of the event data 204 and the event data 205 is overlapped between two frames (the frames 227 and 228). Accordingly, in the example illustrated in FIG. 5, the degree of overlapping of the mapping of the event data is 2.

The system control unit 150 calculates a motion vector by template matching based on a plurality of frames in which there is a difference in the mapping time m between the mapping start times. In the example illustrated in FIG. 5, a motion vector is calculated based on the frames 226 and 228. A motion vector is calculated based on the frame 227 and a frame (not illustrated) in which the mapping starts at a time which passes by the mapping time m from the mapping start time tm2. Thus, the motion vector is calculated for each mapping start time difference d. Accordingly, according to the embodiment, the calculation period of the motion vector can be improved further than in the motion vector calculation method of the related art described with reference to FIG. 4.

In the motion vector calculation method of the embodiment, calculation accuracy of the motion vector is mainly determined in accordance with the mapping time m. This is because the calculation accuracy varies in accordance with the number of pieces of event data included in the frame group 230 and the number of pieces of event data depends on the mapping time m. Because the number of pieces of event data generated per time varies in accordance with a subject condition or a focal distance, a value of the mapping time m for maintaining the calculation accuracy of the motion vector also varies in accordance with the subject condition or the focal distance. For example, as a focal distance of the optical system 181 of the event sensor is larger, a pixel resolution increases. Therefore, the value of the mapping time m for maintaining the calculation accuracy of the motion vector decreases.

On the other hand, the calculation period of the motion vector is determined in accordance with the mapping time m and the degree n of overlapping. When the degree n of overlapping is enlarged, the calculation period of the motion vector is improved. However, a processing load of the optical device may increase. Accordingly, in the embodiment, although the value of the mapping time m is small and the degree n of overlapping is small, the system control unit 150 performs control such that a focal distance of the optical system 181 set by the optical system control unit 301 is as large as possible to maintain a high calculation period. Further, the system control unit 150 determines the mapping time m so that the calculation accuracy of the motion vector is maintained based on the set focal distance. The system control unit 150 determines the calculation period by setting the degree n of overlapping to maintain the calculation period of the motion vector based on the determined mapping time m and setting the mapping start time difference d in accordance with the degree n of overlapping.

Second Embodiment

Figure 6:
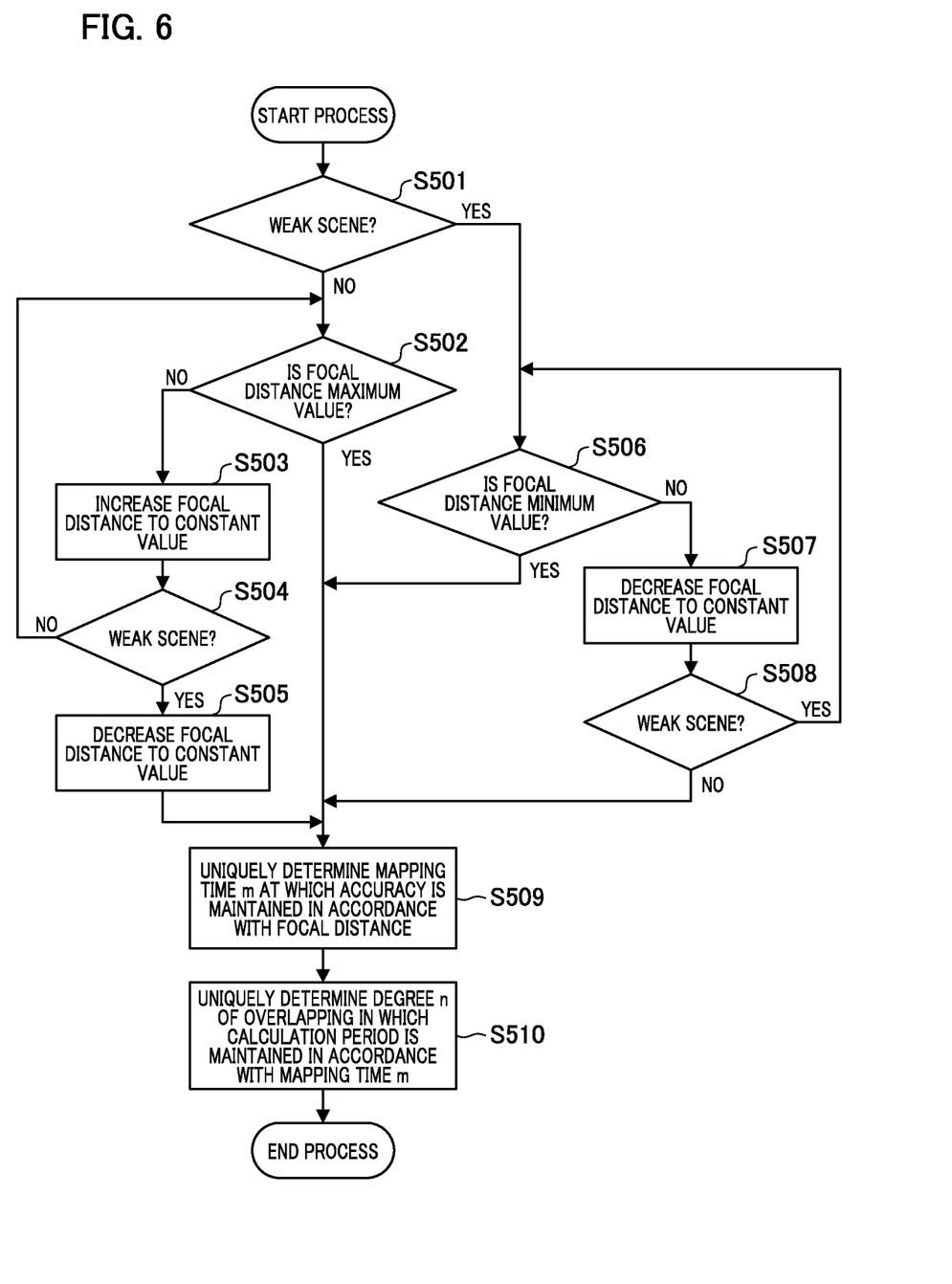
FIG. 6 is a flowchart illustrating an operation process of an optical device according to a second embodiment.

FIG. 6 is a flowchart illustrating an operation process of an optical device according to a second embodiment. An optical device according to the second embodiment performs control such that a focal distance is changed according to whether to detect a weak scene. S in the flowchart of FIG. 6 denotes a step number of each process in the flowchart.

The process in the flowchart of FIG. 6 is realized by allowing the system control unit 150 to execute a program loaded in the system memory 113. The process starts when a photographer sets the imaging device 100 for a subject. In S501, system control unit 150 determines whether a weak scene is detected based on a detection result of a weak scene by the weak scene detection unit 302. When a weak scene is detected, the process proceeds to S506. When the weak scene is not detected, the process proceeds to S502.

In the process of S502 to S504 to be described below, the system control unit 150 gradually increase the focal distance, to reduce a processing load, within a range in which a range in which the weak scene is not detected, that is, a range in which the pixel information of the subject does not satisfy a predetermined subject condition. Thus, the system control unit 150 sets the focal distance to a maximum value within the range in which the weak scene is not detected. In S506 to S508 to be described below, the system control unit 150 gradually decreases the focal distance so that an angle of field at which the weak scene is not detected is realized.

In S502, the system control unit 150 determines whether the focal distance is the maximum value which can be set in the optical system 181. The maximum value of the focal distance which can be set in the optical system 181 is determined, for example, based on an output of the motion vector calculation unit 303 in accordance with a known technology. When the focal distance is the maximum value which can be set in the optical system 181, the process proceeds to S509. When the focal distance is not the maximum value which can be set in the optical system 181, the process proceeds to S503.

In S503, the system control unit 150 increases the focal distance of the optical system 181 to a constant value. Subsequently, in S504, the system control unit 150 determines whether the weak scene is detected. When the weak scene is not detected, the process returns to S502. When the weak scene is detected, the process proceeds to S505. In S505, the system control unit 150 decreases the focal distance of the optical system 181 to a constant value. Then, the process proceeds to S509. Thus, the focal distance of the optical system 181 can be controlled such that the focal distance is the maximum value within the range in which the weak scene is not detected.

In S506, the system control unit 150 determines whether the focal distance is the minimum value which can be set in the optical system 181. The minimum value of the focal distance which can be set in the optical system 181 is determined, for example, based on an output of the motion vector calculation unit 303 in accordance with a known technology. When the focal distance is the minimum value which can be set in the optical system 181, the process proceeds to S509. When the focal distance is not the minimum value which can be set in the optical system 181, the process proceeds to S507.

In S507, the system control unit 150 decreases the focal distance of the optical system 181 to a constant value. Subsequently, in S508, the system control unit 150 determines whether the weak scene is detected. When the weak scene is detected, the process returns to S506. When the weak scene is not detected, the process proceeds to S509. Thus, the focal distance of the optical system 181 can be controlled such that the focal distance is the maximum value within the range in which the weak scene is not detected.

Subsequently, in S509, the system control unit 150 sets the mapping time m based on the focal distance set in the optical system 181. Specifically, the system control unit 150 sets the mapping time m at which the calculation accuracy of the motion vector is maintained based on a change in the focal distance from a start time point of the process to the present time.

Subsequently, in S510, the system control unit 150 sets the degree n of overlapping based on the mapping time m set in S509. Specifically, the system control unit 150 sets the degree n of overlapping in which the calculation period of the motion vector is maintained based on a change in the mapping time m from a start time point of the process to the present time. In the optical device according to the above-described embodiment, it is possible to improve the calculation period while maintaining the calculation accuracy of the motion vector based on the output of the event sensor and suppressing a load of the optical device. The preferred embodiments of the present invention have been described above, but the present invention is not limited to these embodiments and various modifications and changes can be made within the scope of the gist of the present invention. For example, the present invention can be applied by acquiring necessary information from the outside even in a device which does not include an optical system when the device functions as the motion vector calculation device.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-006856, filed Jan. 20, 2021, which is hereby incorporated by reference wherein in its entirety.

What is claimed is:

1. A vector calculation device comprising:
   at least one processor; and
   at least one memory holding a program that makes the processor function as:
   an acquisition unit configured to acquire data including pixel information of a pixel in which a change in luminance occurs;
   a generation unit configured to perform a predetermined process on the data acquired in a first time period from a start time to generate a frame;
   a control unit configured to perform control such that the first time periods are overlapped partially for a plurality of the frames; and
   a calculation unit configured to calculate a motion vector based on a frame group including the plurality of frames for which the start times of the predetermined process are within the first time period from the start time for the first frame in the group.

2. The vector calculation device according to claim 1, wherein the generation unit starts the predetermined process on the data at the end of each second time period determined in accordance with the degree of overlapping of the predetermined process on the data to continuously generate the plurality of frames.

3. The vector calculation device according to claim 2, wherein the calculation unit calculates the motion vector for each second time period.

4. The vector calculation device according to claim 2, wherein the control unit sets the second time period to a time period obtained by dividing the first time period by the degree of overlapping of the predetermined process on the data.

5. The vector calculation device according to claim 1, wherein the pixel information includes coordinate information of the pixel in which a change in luminance occurs, and the predetermined process on the data is mapping of the coordinate information.

6. The vector calculation device according to claim 1, wherein the acquisition unit acquires the data based on an output of a detector detecting a change in luminance.

7. The vector calculation device according to claim 6, wherein the detector is an event-based vision sensor, and wherein the control unit sets the first time period in accordance with a focal distance of an optical system of the vision sensor.

8. The vector calculation device according to claim 7, wherein the control unit sets the first time period based on the focal distance of the optical system of the vision sensor.

9. The vector calculation device according to claim 8, wherein the control unit sets the degree of overlapping of the predetermined process on the data based on the set first time period.

10. The vector calculation device according to claim 7, wherein the processor further functions as an optical system control unit configured to control the optical system of the vision sensor, and wherein the optical system control unit performs control such that the focal distance of the optical system of the vision sensor is changed when it is determined that pixel information of a subject satisfies a predetermined condition based on an output of the detector.

11. The vector calculation device according to claim 10, wherein the optical system control unit performs control such that the focal distance of the optical system of the vision sensor is decreased when the subject is a subject with a straight shape or a contrast of a predetermined region of an angle of field is lower than a threshold.

12. The vector calculation device according to claim 10 wherein the optical system control unit sets the focal distance of the optical system of the vision sensor to a maximum value within a range in which the pixel information of the subject does not satisfy the predetermined condition.

13. An imaging device comprising:
an image sensor configured to image a subject;
at least one processor; and
at least one memory holding a program that makes the processor function as:
  an acquisition unit configured to acquire data including pixel information of a pixel in which a change in luminance occurs;
  a generation unit configured to perform a predetermined process on the data acquired in a first time period from a start time to generate a frame;
  a control unit configured to perform control such that the first time periods are overlapped partially for a plurality of the frames; and
  a calculation unit configured to calculate a motion vector based on a frame group including the plurality of frames for which the start times of the predetermined process are within the first time period from the start time for the first frame in the group; and
  a correction control unit configured to correct shake of a captured image by driving a corrector based on the calculated motion vector.

14. A motion vector calculation method comprising:
acquiring data including pixel information of a pixel in which a change in luminance occurs;
performing a predetermined process on the data acquired in a first time period from a start time to generate a frame;
performing control such that the first time periods are overlapped partially for a plurality of the frames; and
calculating a motion vector based on a frame group including the plurality of frames for which the start times of the predetermined process are within the first time period from the start time for the first frame in the group.

* * * * *